United States Patent
Wright et al.

(10) Patent No.: US 6,825,433 B2
(45) Date of Patent: Nov. 30, 2004

(54) APPARATUS AND METHOD FOR FORMING A BODY

(75) Inventors: Iain W Wright, Derby (GB); Steven A Jones, Derby (GB)

(73) Assignee: Rolls-Royce plc, London (GB)

( * ) Notice: Subject to any disclaimer, the term of this patent is extended or adjusted under 35 U.S.C. 154(b) by 2 days.

(21) Appl. No.: 10/406,265

(22) Filed: Apr. 4, 2003

(65) Prior Publication Data

US 2003/0189028 A1 Oct. 9, 2003

(30) Foreign Application Priority Data

Apr. 9, 2002 (GB) .............................................. 0208226

(51) Int. Cl.$^7$ ................................................ B23K 9/04
(52) U.S. Cl. ................... 219/76.14; 219/125.1
(58) Field of Search .......................... 219/76.14, 76.12, 219/76.16, 125.1

(56) References Cited

U.S. PATENT DOCUMENTS 4,842,186 A    6/1989 Doyle
5,233,150 A  *  8/1993 Schneebeli et al. ...... 219/76.14
6,274,839 B1 *  8/2001 Stone et al. ............. 219/76.14

* cited by examiner

Primary Examiner—Clifford C. Shaw
(74) Attorney, Agent, or Firm—W. Warren Taltavull; Manelli Denison & Selter PLLC

(57) ABSTRACT

A method of forming a hollow section body by deposition of a weld material includes the steps of providing a welding head 12 and a turntable 36 on which the body is to be formed, supplying a weld material to the welding head 12, the weld material to be deposited on the turntable 36 and connecting the turntable 36 and the welding head 12 to a supply of electricity to form an arc between the welding head 12 and the turntable 36 or the body to melt the material. The method includes the steps of manipulating the turntable 36 and the welding head 12 relative to one another to deposit material to form a first wall 40, manipulating the turntable 36 and the welding head 12 relative to one another to deposit material for form a second wall 42 extending from an angle to the first wall 40 and manipulating the turntable 36 and the welding head 12 relative to one another to deposit material to form a third wall 44 joining the first two walls, to form a hollow section body. The hollow section body may be for forming part of a casing structure for a gas turbine engine.

12 Claims, 2 Drawing Sheets

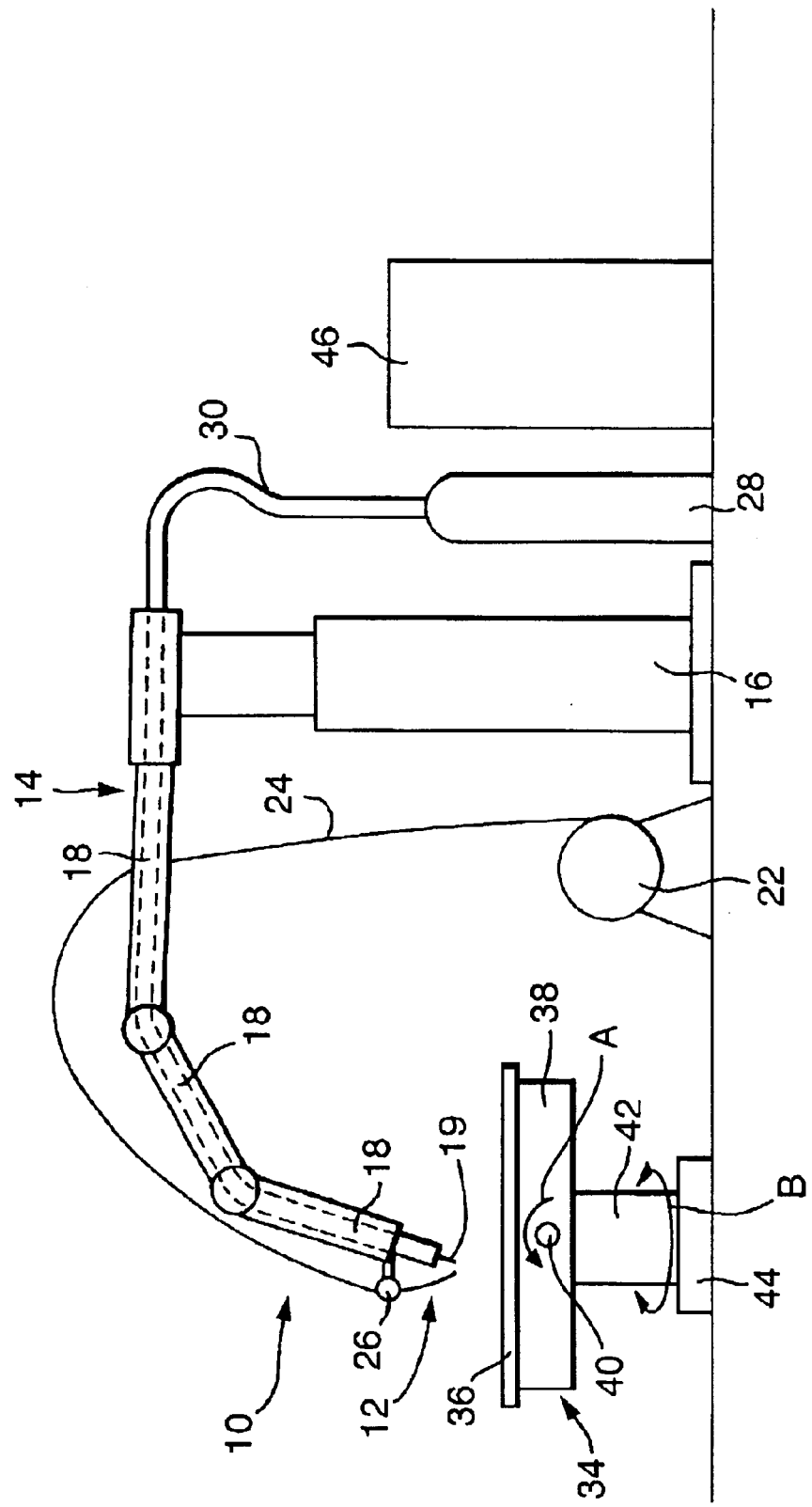

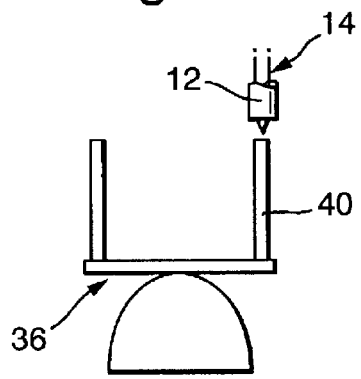
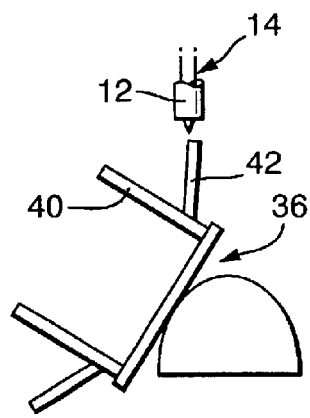
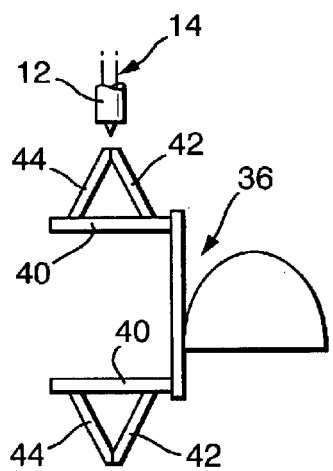
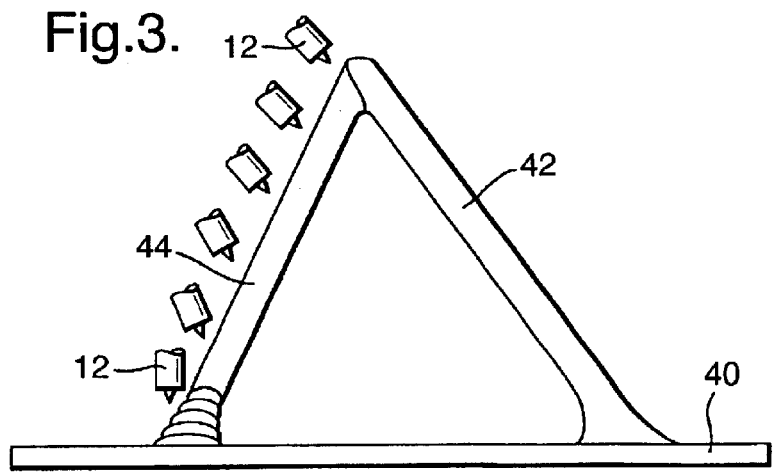

APPARATUS AND METHOD FOR FORMING A BODY

This invention relates to an apparatus and method for forming a body by deposition of a weld material.

The formation of components for aerospace engines can be carried out by any of several techniques involving deposition of a weld material. These techniques utilise an apparatus including two electrodes, the first electrode being held in a welding head to which is fed a supply of a metal wire constituting the weld material. The second electrode is in the form of a substrate or foundation upon which the weld material is to be deposited to form the component. The foundation may be in the form of a metal plate. A supply of an inert gas is fed to the welding head during its operation.

When the welding head and the foundation are connected to a supply of electricity, an arc is formed in the inert gas which melts the metal wire and a small region of the material forming the foundation. The metal is then deposited onto the foundation in a controlled manner. The welding head is mounted on a robotic arm and the foundation is mounted on a movable turntable. By controlling the movement of the arm and the turntable, the metal can be deposited on the foundation in order to form components of any desired shape.

One such method of forming components involves providing the welding head with a permanent electrode and also providing a separate metal wire to the welding head, the metal wire constituting the weld material. This method is generally known in the art as tungsten inert gas welding which is generally shortened to TIG welding. Although tungsten is commonly used, it will be appreciated by those skilled in the art that other suitable materials could be used as the electrode.

Another such method involves the use of a sacrificial electrode in the welding head. With this arrangement, the metal wire which provides the weld material also constitutes the electrode and is fed through the welding head. This method is generally known in the art as metal inert gas welding, which is generally shortened to MIG welding.

According to the invention there is provided a method of forming a body by deposition of a weld material, the method including the steps of:

providing a welding head;

providing a support member upon which the body is to be formed;

supplying a weld material to the welding head, the weld material to be deposited on the support member; and connecting the support member and the welding head to a supply of electricity to form an arc between the welding head and the support member or the body to melt the material, the method further including the steps of:

manipulating the support member and the welding head relative to one another to deposit material to form a first wall;

manipulating the support member and the welding head relative to one another to deposit material to form a second wall extending from and angled to the first wall; and manipulating the support member and the welding head relative to one another to deposit material to form a third wall joining the first two walls to form a hollow section body.

Each wall may be axi-symmetrical. The first wall may be substantially cylindrical. The second and third walls may be generally frustoconical. The hollow section body may be generally annular. The hollow section body may be for forming part of a casing structure for a gas turbine engine.

Preferably the electrical supply is controlled such that during the formation of each wall, the current is higher during the formation of a proximal base part of the wall than it is during the formation of a mid part of the wall, such that the base part of the wall is broader than the mid part of the wall.

Preferably the electrical supply is controlled such that during the formation of each wall, the current is higher when forming a distal part of the wall than when forming the mid part of the wall, such that the distal part of the wall is broader than the mid part of the wall.

Preferably during the formation of the first wall, the support member is oriented substantially horizontally and the welding head substantially vertically, such that a substantially vertical first wall is produced.

Following the formation of the first wall, preferably the support member is tilted to an angle of between 10° and 50° to the horizontal. The second wall may then be deposited onto the first wall at an angle thereto. The support member and the welding head may be manipulated such that the first wall is held at an angle to the horizontal and the second wall is built up on the first wall. The second wall may be built up substantially vertically.

Following formation of the second wall, the support member may be manipulated such that the second wall is angled to the vertical. The first wall may be substantially horizontal. The support member and the welding head may then be manipulated to form the third wall, joining the first and second walls.

The method may include the step of further producing fourth and optionally subsequent walls, the walls together forming a hollow section body.

During the formation of an angled wall, the welding head may initially be oriented substantially vertically. As the wall is built up, the orientation of the head may be gradually altered such that its angle to the vertical gradually increases.

The method may include the steps of:

initially producing a two or three dimensional model of the body to be formed, using computer aided design and computer aided manufacturing software;

taking into account the geometry of the support member and of the means for manipulating the welding head, producing a defined path for the welding head to follow;

using the above information to produce a welding program in which each positionable point for the welding head is defined; and utilising the above program to control the means for manipulating the welding head.

Preferably the method includes the use of a robot for manipulating the welding head, the robot preferably having six degrees of freedom of movement.

An embodiment of the invention will now be described for the purpose of illustration only with reference to the accompanying drawings in which:

BRIEF DESCRIPTION OF THE DRAWINGS

FIG. 1 is a diagrammatic side view of apparatus for forming a body;

FIGS. 2A to 2C are diagrammatic illustrations of a process for forming a body; and FIG. 3 is a diagrammatic illustration showing the formation of the final wall of the body.

Referring to FIG. 1, there is shown an apparatus 10 for forming a body by deposition of a weld material. The apparatus 10 includes an arc welding head 12, mounted on a free end of a support mechanism in the form of a robot arm 14. The robot arm 14 includes a base member 16 on which are pivotally mounted a plurality of sections 18 which are rotatable relative to one another and about their own axes so that the welding head 12 can be manipulated to any desired position. The welding head 12 includes a first electrode 19.

A supply of a metal wire 24 is provided, in the form of a reel 22 around which the wire 24 is wound. The metal is in the form of a titanium alloy, for example titanium 6/4 which includes 6% aluminium and 4% vanadium. The wire 24 is fed from the reel 22 to the welding head 12 such that an end of the wire 24 is held just below the tip of the welding head 12. The wire 24 is held in place by suitable holding means 26.

The apparatus 10 also includes a supply of an inert gas, stored in a cylinder 28. A pipe 30 leads from the cylinder 28 to the welding head 12 through the sections 18. The gas is any suitable inert gas or gases or combinations of inert and active gases, for example argon or argon/carbon dioxide, and provides the medium in which an arc is formed, as will be explained below.

Support means 34 is provided beneath the welding head 12 and includes a turntable 36 mounted upon a platform 38. The platform 38 is pivotally mounted as indicated by the arrow A, by pivot 40, to a pedestal 42 which in turn is rotatably mounted, as indicated by the arrow B, upon a base member 44.

Control means in the form of a computer 46 controls the movement of the support means 34 and the robot arm 14, as well as controlling the supply of the inert gas, and the supply of the metal wire 24.

In operation, the turntable 36 and the welding head 12 are connected to a supply of electricity, and argon is fed via the pipe 30 from the cylinder 28 to the welding head 12 to form an argon shroud around the electrode of the welding head 12. The argon shroud extends to the substrate on which material is to be deposited (i.e. the support member or the part of the body being worked upon). The argon gas is ionised to form a plasma and an arc is created between the first electrode 19 in the welding head 12 and the substrate. The arc produces a high temperature, which is sufficient to melt the material of the substrate in the vicinity of the arc and to melt the end of the wire 24 which is also in the vicinity of the arc. This melted material from the wire 24 and the foundation plate 52 forms a molten weld pool.

The position of the welding head 12 relative to the turntable 36 is controlled by the computer 46 by manipulating both the position of the welding head 12, and the position of the turntable 36. The computer 46 also controls the rate of feeding of the wire 24. Thus, by appropriate manipulation of the welding head 12 relative to the turntable 36, a component, for example for use in a gas turbine engine, can be built up layer by layer by the deposition of the weld material from the wire 24. As will be appreciated when the body is partially formed, the welding head 12 deposits material on the body rather than the support member. In this case, the shroud extends from the welding head 12 to the part of the body being formed and the arc is created between the welding head 12 and the body. The term "substrate" is intended to cover either the support member or the body as appropriate.

Referring to FIGS. 2A to 2C and FIG. 3, there is illustrated a method of forming a hollow section body.

Referring to FIG. 2A, in a first step, the turntable 36 and the robot arm 14 are manipulated such that the turntable 36 is located substantially horizontally and the welding head 12 on the robot arm 14 is oriented substantially vertically. The welding head 12 and the turntable 36 are both connected to a supply of electricity and the turntable 36 rotated together with the welding head being raised, to form a generally cylindrical first wall, 40, layer by layer.

Referring to FIG. 2B, the turntable 36 is then tilted, such that the cylindrical first wall 40 is angled to the vertical. The welding head 12 is then manipulated to form a frustoconical second wall 42, angled to the first wall. The turntable 36 is again rotated so that the second wall extends all around the first.

Referring to FIGS. 2C and 3, the turntable 36 is again manipulated such that the substantially cylindrical first wall 40 is oriented generally with its axis horizontally. The second wall 42 is thus at an angle of say 20° to 30° to the vertical. The robot arm 14 and the welding head 12 are then manipulated to form a frustoconical third wall 44, joining the first two walls 40 and 42 and forming a closed triangular section body.

Referring to FIG. 3, it may be seen that initially the welding head 12 is oriented substantially vertically. As the welding head 12 is raised to form the wall 44, its angle to the vertical is gradually increased until it is eventually angled at about 20° to 30° to the vertical.

When the welding head is at the base of a wall, starting to form the wall, the current is set to be relatively high. This causes the formation of a relatively large weld pool and thus a thick wall as may be seen in FIG. 3. As the welding head is raised towards the mid point of each wall, the current is reduced thus reducing the width of the wall. By having a relatively thick portion at the base of each wall, the heat may be effectively dissipated and the joins between adjacent walls tends to be smooth and include no sharp edges. The current is again increased towards the distal ends of each wall and this, together with the angle of the welding head, ensures that the walls join smoothly and in a curved manner.

There is thus provided a method for providing hollow structures. Whereas in prior art methods such as casting, there is a need for holes in such hollow structures, the above method enables the formation of truly hollow, enclosed shapes. This improves the structural integrity of the body.

The above hollow, triangular sections may be used to stiffen casings, in particular the inner case of a jet engine.

Various modifications may be made to the above described embodiment without departing from the scope of the invention. In particular, the exact orientations of the support member and the welding head will depend upon the shape of material to be formed and is not fixed. However, the person skilled in the art will be able to determine suitable orientations in each case.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A method of forming a body by deposition of a weld material, the method including the steps of:

providing a welding head;

providing a support member upon which the body is to be formed;

supplying a weld material to the welding head, the weld material to be deposited on the support member; and connecting the support member and the welding head to a supply of electricity to form an arc between the welding head and one of the support member and the body to melt the material, the method further including the steps of:

manipulating the support member and the welding head relative to one another to deposit material to form a first wall;

manipulating the support member and the welding head relative to one another to deposit material to form a second wall extending from and angled to the first wall; and manipulating the support member and the welding head relative to one another to deposit material to form a third wall joining the first two walls to form a hollow section body.

2. A method according to claim 1, wherein each wall is axi-symmetrical.

3. A method according to claim 1, wherein the hollow section body forms part of a casing structure for a gas turbine engine.

4. A method according to claim 1 wherein the electrical supply is controlled such that during the formation of each wall, the current is higher during the formation of a proximal base part of the wall than it is during the formation of a mid part of the wall, such that the base part of the wall is broader than the mid part of the wall.

5. A method according to claim 1, wherein the electrical supply is controlled such that during the formation of each wall, the current is higher when forming a distal part of the wall than when forming the mid part of the wall, such that the distal part of the wall is broader than the mid part of the wall.

6. A method according to claim 1, wherein during the formation of the first wall, the support member is oriented substantially horizontally and the welding head substantially vertically, such that a substantially vertical first wall is produced.

7. A method according to claim 1, wherein following the formation of the first wall, the support member is tilted to an angle of between 10° and 50° to the horizontal and the second wall deposited onto the first wall at an angle thereto.

8. A method according to claim 1, where following formation of the second wall, the support member is manipulated such that the second wall is angled to the vertical and the support member and the welding head are then manipulated to form the third wall, joining the first and second walls.

9. A method according to claim 1, wherein the method includes the step of further producing fourth and optionally subsequent walls, the walls together forming a hollow section body.

10. A method according to claim 1, wherein during the formation of an angled wall, the welding head is initially oriented substantially vertically, and as the wall is built up, the orientation of the head is gradually altered such that its angle to the vertical gradually increases.

11. A method according to claim 1, the method including the steps of:

initially producing one of two and three dimensional model of the body to be formed, using computer aided design and computer aided manufacturing software;

taking into account the geometry of the support member and of the means for manipulating the welding head, producing a defined path for the welding head to follow;

using the above information to produce a welding program in which each positionable point for the welding head is defined; and utilising the above program to control the means for manipulating the welding head.

12. A method according to claim 1, wherein the method includes the use of a robot for manipulating the welding head, the robot having at least six degrees of freedom of movement.

* * * * *